United States Patent [19]
Kawakatsu

[11] Patent Number: 5,146,130
[45] Date of Patent: Sep. 8, 1992

[54] INCANDESCENT LAMP HAVING GOOD COLOR RENDERING PROPERTIES AT A HIGH COLOR TEMPERATURE

[75] Inventor: Akira Kawakatsu, Yokohama, Japan

[73] Assignee: Toshiba Lighting & Technology Corporation, Tokyo, Japan

[21] Appl. No.: 538,328

[22] Filed: Jun. 15, 1990

[30] Foreign Application Priority Data

Jun. 17, 1989 [JP] Japan ............................ 1-155221

[51] Int. Cl.$^5$ ............................................. H01K 1/32
[52] U.S. Cl. .......................................... 313/112; 313/579
[58] Field of Search ............................. 313/112, 579

[56] References Cited

U.S. PATENT DOCUMENTS

| | | |
|---|---|---|
| 4,652,789 | 3/1987 | Kawakatsu et al. ............. 313/112 |
| 4,701,663 | 10/1987 | Kawakatsu et al. ............. 313/112 |
| 4,839,553 | 6/1989 | Mellor ............................. 313/111 |

FOREIGN PATENT DOCUMENTS 0164064 12/1985 European Pat. Off. .
2103830 2/1983 United Kingdom .

*Primary Examiner*—Palmer C. DeMeo
*Attorney, Agent, or Firm*—Oblon, Spivak, McClelland, Maier & Neustadt

[57] ABSTRACT

Four different optical interference films are formed on the outer surface of an incandescent lamp to achieve good color rendering properties at a high color temperature. A first film formed on the lamp includes high and low refractive index layers alternately stacked so that the total number of layers is n (where n is odd number greater than 5) and the optical thickness thereof is 0.12~0.17 μm. A second film formed on the first film has the low refractive index layer and the optical thickness of 0.132~0.2125 μm, which is calculated by the equation (K+1)×d/2, wherein K is 1.2~1.5 and d is the optical thickness of each refractive index layer of the first film. A third film formed on the second film has at least a high refractive index layer. The total number of refractive index layers of the third film is an odd number of 1~(n−4) and the optical thickness of each refractive index layer thereof is 0.144~0.255 μm, which is calculated by the expression (K×d). A fourth film includes the low refractive index layer having the optical thickness of 0.0720~0.1275 μm, which is calculated by the expression (K ×d/2).

5 Claims, 4 Drawing Sheets

INCANDESCENT LAMP HAVING GOOD COLOR RENDERING PROPERTIES AT A HIGH COLOR TEMPERATURE

BACKGROUND OF THE INVENTION

1. Field of the Invention

This invention relates, in general, to incandescent lamps. In particular, the invention relates to an incandescent lamp having an optical interference film formed on the surface thereof to increase the color temperature of light radiated therefrom.

2. Discussion of the Background

In recent years, a light source, a so-called cool beam, having a small amount of infrared light and also having good color rendering properties has been desired as a spot light in stores, etc. To achieve this light source in an incandescent lamp, conventionally a color temperature conversion filter has been used in the lamp as a front glass or a dichroic mirror is used to cut the unnecessary light element from the spectrum. However, in such light sources using the color temperature conversion filter or the dichroic mirror, the efficiency of the lamp is lowered because of the elimination of the unnecessary light elements. Thus, a high color temperature of light from the lamp is not achieved.

An interference filter including a plurality of dielectric films of $TiO_2$—$SiO_2$ has a high temperature resistance and may be formed on either inner or outer surface of the bulb of the incandescent lamp, as an infrared reflecting film, to reflect a large amount of infrared light. The filament disposed in the bulb is heated by reflected infrared light to improve the efficiency of the lamp. The above-described interference filter may be applied to an incandescent lamp, e.g., a halogen lamp, whose bulb surface temperature is relatively high. Thus, the incandescent lamp on which the conventional interference filter is formed has a high color temperature, as compared with the lamp on which the color temperature conversion filter or the dichroic mirror is formed. However, it is difficult to achieve desirable color rendering properties similar to that of sunlight even if an interference filter of a $\lambda/4$ film normally used as an infrared reflecting film or an interference filter of a $\lambda/4$ film wherein a $\lambda/2$ low refractive index layer is sandwiched between high refractive index layers is applied to the lamp. This is because the transmttance of these conventional interference filters rapidly decreases or undulates in the range between 400 nm and 700 nm, and the spectrum of light output from the lamp through the conventional filter is different from that of sunlight. Thus, the lamp on which this conventional interference filter is formed can not achieve good color rendering properties at a high color temperature, e.g., greater than about 3400K.

SUMMARY OF THE INVENTION

Accordingly, it is an object of the present invention to achieve good color rendering properties at a high color temperature in an incandescent lamp.

Another object of the present invention is to provide a lamp having an interference filter formed thereon in the form of a series of layers.

Another object of this invention is to provide a cool beam light source having a small amount of infrared light and good color rendering properties.

It is still a further object of this invention to provide an incandescent lamp bulb having four optical interference films formed thereon to achieve good color rendering properties.

It is still a further object of the present invention to provide a bulb having a series of interference films formed thereon where the first film includes a plurality of high and low refractive index layers, and the optical thickness of the second, third and fourth films depends on the optical thickness of one of the high and low refractive index layers of the first film.

These and other objects are achieved by providing an incandescent lamp including a bulb, a filament supported in the bulb, a first optical interference film, formed on one of inner and outer surfaces of the bulb, which includes a first refractive index layer having a prescribed refractive index and a second refractive index layer having a predetermined refractive index lower than that of the first refractive index layer alternately stacked so that the total number of first and second refractive index layers is n (where n is an odd number greater than five) and the optical thickness d of each refractive index layer is $0.12 \sim 0.17$ μm, a second optical interference film including another second refractive index layer the optical thickness of which is indicated by the equation $(K+1) \times d/2$ (where K is $1.2 \sim 1.5$) formed on the first optical interference film, a third optical interference film, including at least the first refractive index layer, which is formed on the second optical interference film so that the total number of first and second refractive index layers is an odd number of $1 \sim (n-4)$ and the optical thickness of each refractive index layer is indicated by the expression $K \times d$, and a fourth optical interference film including another second refractive index layer the optical thickness of which is indicated by the expression $K \times d/2$ formed on the third optical interference film.

The second refractive index layer of the second optical interference film may have an optical thickness of $0.132 \sim 0.2125$ μm. Each refractive index layer of the third optical interference film may have an optical thickness of $0.1440 \sim 0.255$. The second refractive index layer of the fourth optical interference film may have an optical thickness of $0.0720 \sim 0.1275$ μm.

The incandescent lamp may also include a third refractive index layer, having a target refractive index between those of first and second refractive index layers, which is sandwiched between the first refractive index layer of the first optical interference film and the surface of the bulb.

BRIEF DESCRIPTION OF THE DRAWINGS

These and other objects and advantages of this invention will become apparent from the following detailed description of the presently preferred embodiment of the invention, taken in conjunction with the accompanying drawings of which.

DETAILED DESCRIPTION OF THE PREFERRED EMBODIMENTS

Figure 1:
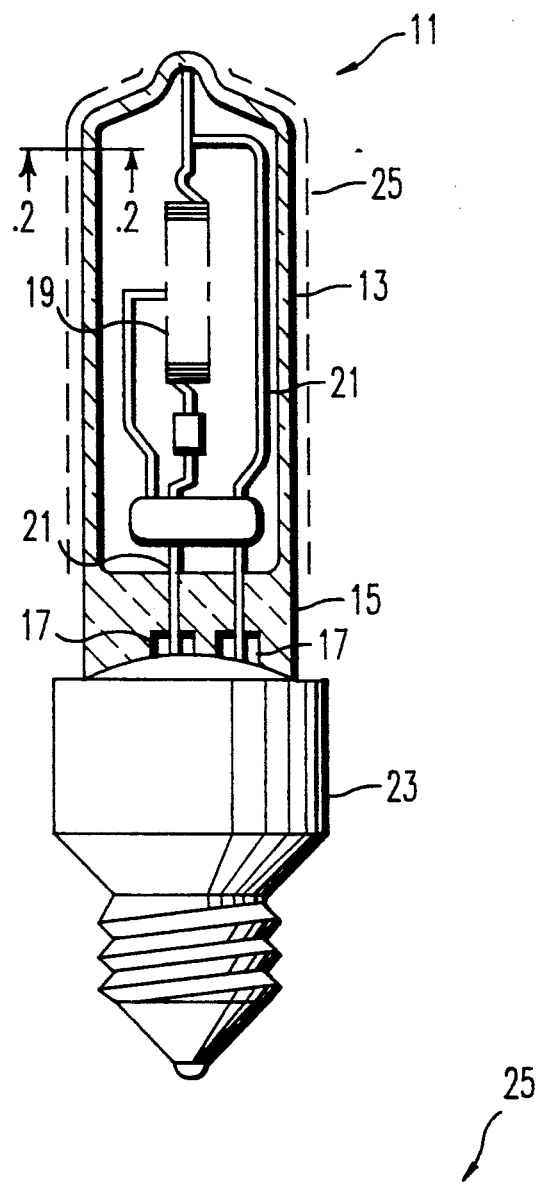
FIG. 1 is a sectional side view illustrating a halogen lamp of one embodiment of the present invention.

Referring now to the drawings, wherein like reference numerals designate identical or corresponding parts throughout the several views, and more particularly to FIG. 1 thereof, which shows the present invention applied to a well known halogen lamp. A halogen lamp 11 includes a transparent straight bulb 13 preferably made of a quartz glass. The bulb has a high heat resistance. One end of bulb 13 is closed and the other end is pinched to form a sealed portion 15. A pair of molybdenum foils 17, 17 is disposed in sealed portion 15. A tungsten coiled filament 19 acting as a light emitting material is arranged along the center line of bulb 13. Each end of coiled filament 19 is connected to the individual foil 17 through a pair of inner lead wires 21, 21, respectively. Sealed portion 15 of bulb 13 is fixed into an anchor 23. An inert gas such as argon and a prescribed amount of halogen fill bulb 13. An optical interference filter 25 having a plurality of films is formed on the outer surface of bulb 13. Optical interference filter 25 may be formed on the inner surface of bulb 13.

Figure 2:
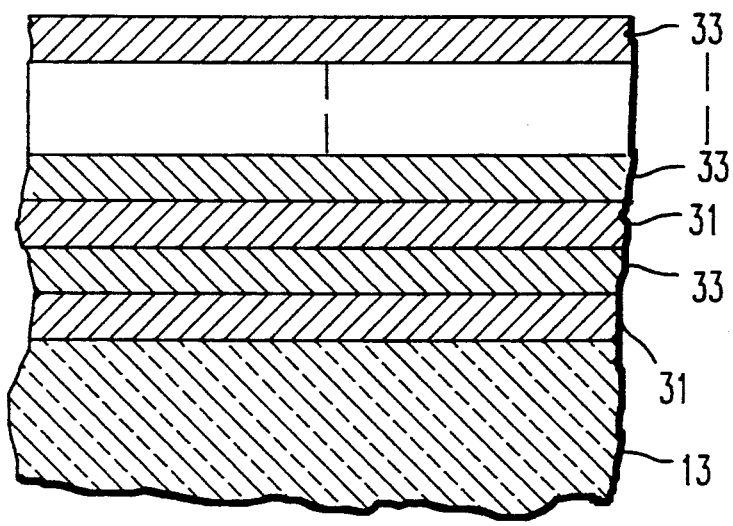
FIG. 2 is an enlarged schematic sectional view taken on line II—II of FIG. 1.

The construction of the above-described optical interference filter 25 will be described. As shown in FIG. 2, optical interference filter 25 includes a first refractive index layer 31 (hereinafter refered as a high refractive index layer) made of titanium oxide ($TiO_2$), tantalum oxide ($Ta_2O_5$), zirconium oxide ($ZrO_2$), zinc sulfide (ZnS), or similar materials and a second refractive index layer 33 (hereinafter refered as a low refractive index layer) made of magnesium fluoride ($MgF_2$), silicon oxide ($SiO_2$) or similar materials. High and low refractive index layers 31 and 33 are stacked on the surface of bulb 13, alternately. The refractive index of high refractive index layer 31 is greater than that of low refractive index layer 33. Preferably, high refractive index layer 31 has a refractive index greater than 2.0, and low refractive index layer 33 has a refractive index less than 1.6.

High and low refractive index layers 31 and 33 of optical interference filter 25 of this embodiment are grouped into first, second, third and fourth optical interference films, starting from the surface of bulb 13. In the first optical interference film, high and low refractive index layers 31 and 33 are alternately stacked in order on the surface of bulb 13 so that the total number of high and low refractive index layers 31 and 33 is n (where n is an odd number greater than five). Furthermore, the optical thickness of each refractive index layer of the first optical interference film is 0.12~0.17 μm. The second optical interference film includes a low refractive index layer 33 whose optical thickness is 0.132~0.2125 μm, which is calculated by the following equation:

$$(K + 1) \times \frac{d}{2}$$

wherein K is 1.2~1.5 and d is the optical thickness of each refractive index layer of the first optical interference film. The value K is derived from an experiment wherein the optical thickness of each refractive index layer was varied and the transmittance of the lamp was plotted with respect to the wavelength range of visible rays. The range of the value K is determined in terms of a high color temperature and a high color rendering properties of the lamp. If the value K is decreased below 1.2, the color temperature of the lamp is high whereas the color rendering properties of the lamp is insufficient. If the value K is increased above 1.5, the color temperature of the lamp is decreased and the color rendering properties of the lamp also is insufficient. In the third optical interference film, the total number of the layers is an odd number of 1~(n−4). If the total number of the layer is 1, only high refractive index layer 31 is formed on the second optical interference film, as a third optical interference film. Otherwise, high and low refractive index layers 31 and 33 are alternately stacked in order on the second optical interference film. The optical thickness of each refractive index layer of the third optical interference film is 0.1440~0.255 μm, which is calculated by an expression (K×d). The fourth optical interference film includes low refractive index layer 33 and the optical thickness thereof is 0.0720~0.1275 μm, which is calculated by an expression (K×d/2). From a practical point of view, the total number of high and low refractive index layers 31 and 33 of optical interference filter 25 is preferably less than 17. If the total number of high and low refractive index layers 31 and 33 is equal to or greater than 17, the transmittance of optical interference filter 25 is greatly decreased.

The above-described optical interference filter 25 is formed on halogen lamp 11 by the following processes. First, a titanium liquid having the titanium content of 2~10% by weight and a viscosity of about 2.0 cps is prepared by dissolving an organotitanium compound such as tetraisopropyl-titanate into an organic solvent. A silicon liquid having a silicon content of 2~10% by weight and the viscosity of about 1.0 cps is prepared by dissolving an organosilicon compound such as ethyl-silicate into an organic solvent. In a first step, bulb 13 of halogen lamp 11 is dipped into the above-described titanium liquid in an atmosphere of a constant temperature and a constant humidity, and then drawn up from the titanium liquid at a prescribed speed. Thus, the titanium liquid is applied to the outer surface of bulb 13 at a prescribed optical thickness. Bulb 13 with the titanium liquid is baked at about 600° C. for about five minutes in an atmosphere after drying. Thus, the high refractive index layer 31 is fixed on bulb 13. The optical thickness of this layer can be controlled by regulating the drawing speed of bulb 13 from the titanium liquid. In a second process, bulb 13 on which high refractive index layer 31 is fixed is dipped into the above-described silicon liquid in an atmosphere of constant temperature and constant humidity, and then drawn up from the silicon liquid at a prescribed speed. The silicon liquid is applied at a prescribed optical thickness to high refractive index layer 31 fixed on the surface of bulb 13. Bulb 13 with the silicon liquid is baked at about 600° C. for about five minutes in an atmosphere after drying. Thus, the low refractive index layer 33 is fixed on high refractive index layer 31 formed on bulb 13. The optical thickness of low refractive index layer 33 is also controlled by regulating the drawing speed of bulb 13 from the silicon liquid.

As can be understood from the above description, first, second, third and fourth optical films can be formed on the outer surface of bulb 13 by repeatedly carring out the above-described processes, as the drawing speed of bulb 13 in each process is regulated.

An experiment was carried out to observe a color temperature and color rendering properties of the above-described embodiment and the prior art.

TABLE

|  | SAMPLE A | SAMPLE B | SAMPLE C |
| --- | --- | --- | --- |
| NUMBER OF LAYER |  |  |  |
| 1 | d | d | d |
| 2 | d | 2 d | d |
| 3 | d | d | d |
| 4 | d | d | d |
| 5 | d | d | d |
| 6 | d | d | d |
| 7 | d | d | d |
| 8 | d | d | 1.2 d |
| 9 | d | d | 1.4 d |
| 10 | ½ d | ½ d | 0.7 d |
| COLOR TEMP. | 5800 K | 4700 K | 5750 K |
| COLOR RENDERING PROPERTIES (Ra) | 81 | 88 | 95 |

In the above TABLE, sample A is the conventional lamp on which the filter of a λ/4 film is formed. Sample B is another conventional lamp on which a λ/4 film including a λ/2 low refractive index layer sandwiched between high refractive index layers is formed. Sample C is the lamp on which the filter of the one embodiment is formed. The number of layers are counted from the surface of the bulb. Odd numbered layers are the high refractive index layer, and even numbered layers are the low refractive index layer. The optical thickness of each refractive index layer is d which has a preferable range of the optical thickness of about 0.12~0.17 μm. In sample C, the first optical interference film includes first to seventh layers. The second optical interference film includes an eighth layer. The third optical interference film includes a ninth layer and the fourth optical interference film includes a tenth layer.

As can be understood from the TABLE, sample C achieves both good color rendering properties and a high color temperature, as compared with samples A and B.

Figure 3:
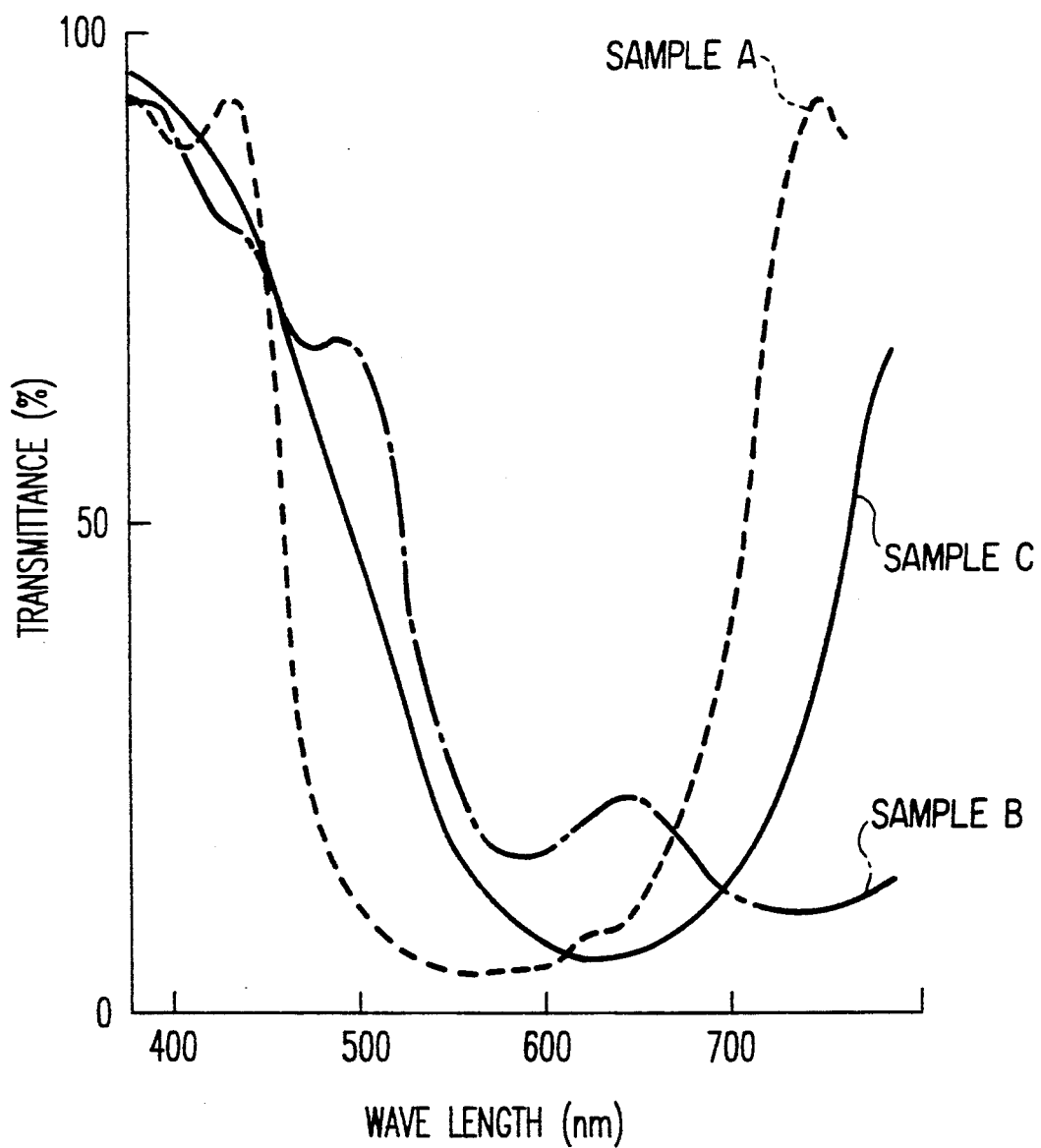
FIG. 3 is a graph showing changes in the transmittance of three samples A, B and C with respect to the wavelength range of visible light.

As shown in FIG. 3, in sample A, the transmittance curve thereof within the wavelength range of visible light, e.g., 380 nm~760 nm, rapidly decreases above the wavelength of 400 nm, and excessively decreases in the vicinity of the wavelength of 500 nm. Thus, the color rendering properties (Ra) of sample A decreases to nearly 80 and the light radiated from sample A is colored blue.

In sample B, the transmittance curve thereof gradually decreases, but it undulates within the wavelength range of visible light. Thus, sample B does not present good color rendering properties.

However, in sample C, the transmittance curve gradually decreases from 400 nm toward 600 nm and it does not undulate within the visible wavelength range. Thus, good color rendering properties can be achieved by sample C.

Figure 4:
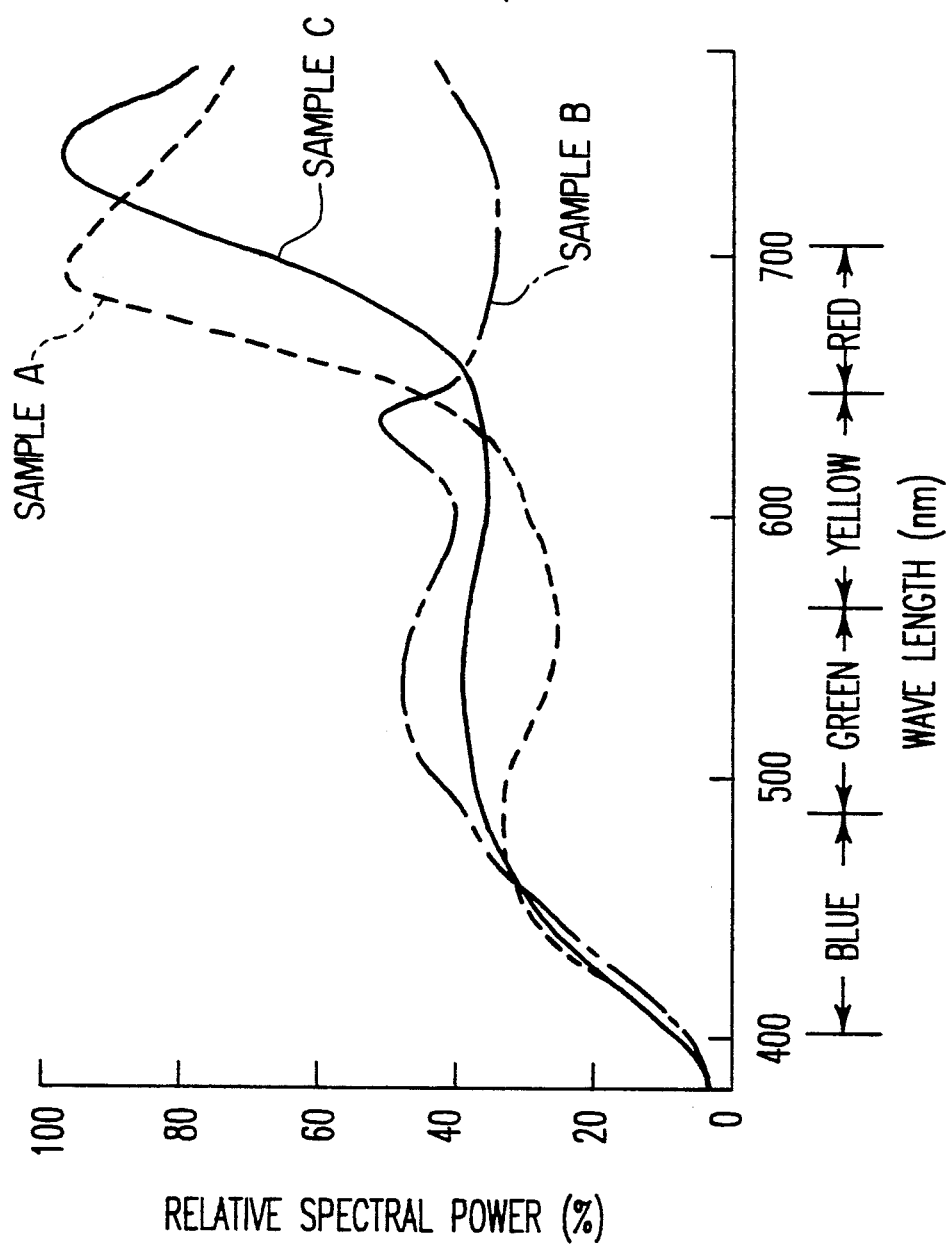
FIG. 4 is a graph showing changes in the relative spectral power of the three samples A, B and C within the wavelength range of visible light.

To prove the above discussions, FIG. 4 shows changes in each relative spectral power within the visible wavelength range relating to the above-described three samples A, B and C. As can be seen in FIG. 4, the relative spectral power of sample C is stable within the range from blue to red in the spectrum. This indicates that sample C has good color rendering properties within the visible wavelength range. On the other hand, in samples A and B, changes in each relative spectral power are unstable within the visible rays wavelength range. In FIG. 4, the red range in the spectrum is extending over 700 nm in practice. However, the ability at which human's eyes perceive red decreases toward 700 nm. Thus, it is enough that the relative spectral power is stable up to a wavelength in the visinity of 700 nm.

Figure 5:
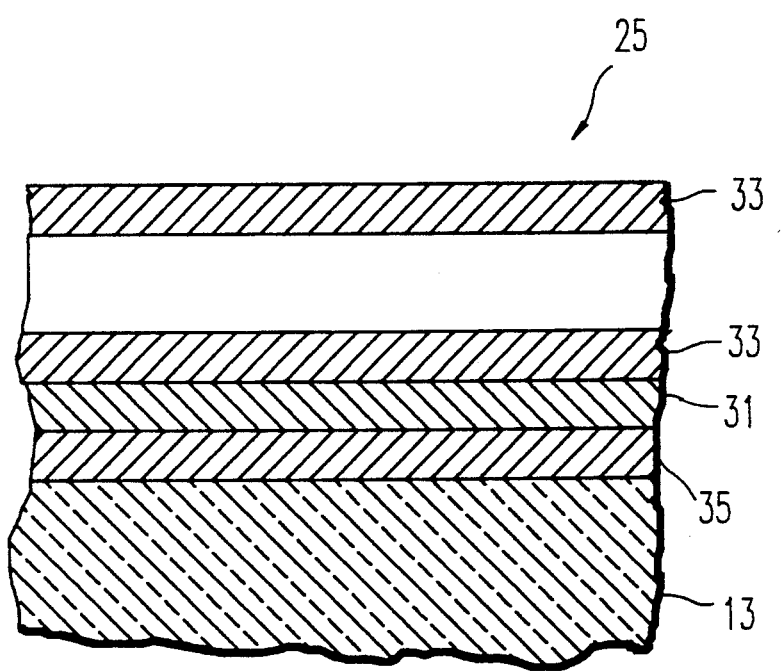
FIG. 5 is an enlarged schematic sectional view illustrating the construction of the optical interference filter of a second embodiment.

A second embodiment of the present invention will be described with reference to FIG. 5. In the second embodiment, an intermediate refractive index layer 35 is sandwiched between the surface of bulb 13 and high refractive index layer 31 of the first optical interference film, Intermediate refractive index layer 35 has a refractive index of 1.7~1.9 between those of high and low refractive index layers 31 and 33. The optical thickness of intermediate refractive index layer 35 is d/2 (where d is the optical thickness of each refractive index layer of the first optical interference film).

With the above-described second embodiment, a higher color temperature of light radiated from the lamp can be achieved, as compared with the first embodiment.

In accordance with the present invention, good color rendering properties can be achieved at a high color temperature by forming four different optical interference films on either inner or outer surface of an incandescent lamp, e.g., a halogen lamp.

The present invention has been described with respect to specific embodiments. However, other embodiments based on the principles of the present invention should be obvious to those of ordinary skill in the art. Such embodiments are intended to be covered by the claims.

What is claimed as new and desired to be secured by Letters Patent of the United States is:

1. An incandescent lamp comprising:
a transparent bulb;
a filament supported in the bulb;
a first optical interference film formed on one of inner and outer surfaces of the bulb, the first optical interference film including a first refractive index layer having a prescribed refractive index and a second refractive index layer having a predetermined refractive index lower than that of the first refractive index layer alternately stacked one on another, the total number of first and second refractive index layers being n (where n is an odd number greater than five), the optical thickness d of each refractive index layer being 0.12~0.17 μm;
a second optical interference film including another second refractive index layer, formed on the first optical interference film, the optical thickness of the second refractive index layer of the second optical interference film being indicated by the expression (K+1)×d/2 (where K is 1.2~1.5);
a third optical interference film formed on the second optical interference film, the third optical interference film including at least the first refractive index layer, the total number of first and second refractive index layers being an odd number of 1~(n−4), the optical thickness of each refractive index layer of the third optical interference film being indicated by the expression K×d; and
a fourth optical interference film including another second refractive index layer, formed on the third optical interference film, the optical thickness of the second refractive index layer of the fourth optical interference film being indicated by the expression K×d/2.

2. A lamp according to claim 1 further including a third refractive index layer sandwitched between the first refractive index layer of the first optical interference film and the surface of the bulb, the third refractive index layer having a target refractive index between those of the first and second refractive index layers and a thickness of d/2.

3. A lamp according to claim 2, wherein the prescribed refractive index of the first refractive index layer is greater than 2.0.

4. A lamp according to claim 3, wherein the predetermined refractive index of the second refractive index layer is smaller than 1.6.

5. A lamp according to claim 4, wherein the target refractive index of the third refractive index layer is 1.7~1.9.

* * * * *